United States Patent [19]

Kachel

[11] Patent Number: 5,029,047
[45] Date of Patent: Jul. 2, 1991

[54] LIGHTED FIBER OPTIC MOBILE

[76] Inventor: Bruce S. Kachel, 5105 Woodstock Rd., Acworth, Ga. 30101

[21] Appl. No.: 528,557

[22] Filed: May 24, 1990

[51] Int. Cl.⁵ .............................................. F21V 7/04
[52] U.S. Cl. .................................. 362/32; 362/253; 362/806; 362/807; 362/293; 40/431; 40/547; 446/242
[58] Field of Search ................... 362/32, 35, 234, 252, 362/253, 283, 284, 319, 806, 807, 293; 40/473, 480, 431, 432; 446/242; 272/31 R, 900

[56] References Cited
U.S. PATENT DOCUMENTS 4,097,917 6/1978 McCaslin ........................ 362/35 X
4,279,089 7/1981 Murakami ............................ 40/547
4,363,181 12/1982 Hyman et al. ................. 446/242 X

FOREIGN PATENT DOCUMENTS 464201 2/1927 Fed. Rep. of Germany .... 272/31 R

Primary Examiner—Stephen F. Husar
Attorney, Agent, or Firm—Michael V. Drew

[57] ABSTRACT

An infant crib mobile wherein the objects or characters attached to its appendages, or any point on the appendages, can emit active, (twinkling or sequencing) colorful light. This is accomplished by utilizing optic fibers to transmit light from a light source in the mobile's central housing to the objects or characters, or a given location on the appendages. The light is made active and colorful at the output end of the optic fibers by placing a light influencing slide between the light source and the input end of the revolving optic fibers that are routed from the appendages and are grouped together in front of the light source.

13 Claims, 3 Drawing Sheets

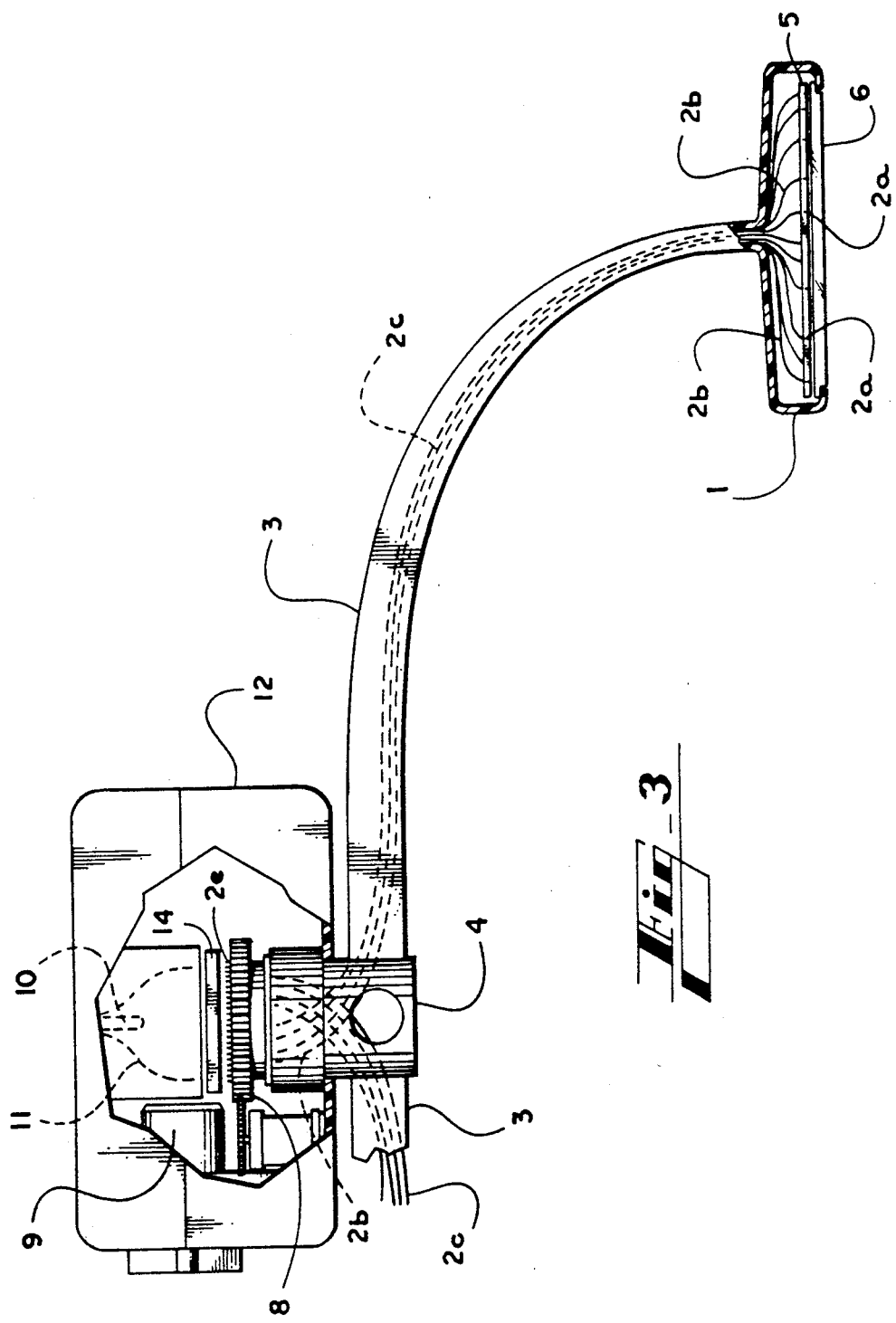

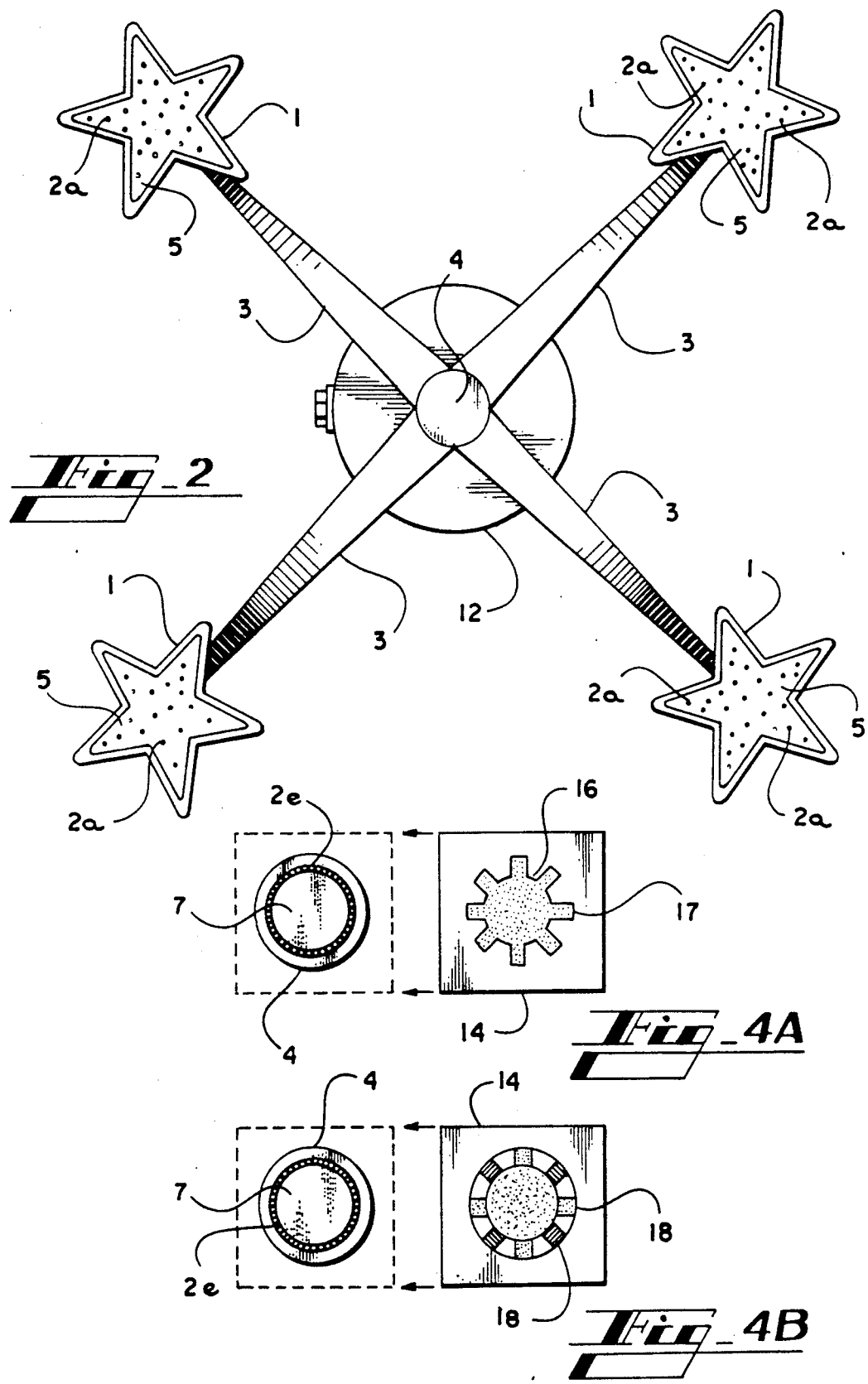

LIGHTED FIBER OPTIC MOBILE

BACKGROUND OF INVENTION

1. Field of Invention

The present invention relates to items for the infant nursery. More specifically, infant crib mobiles.

2. Description of Related Art

The purpose of the infant crib mobile is to give the newborn infant something pleasant and stimulating to look at and/or listen to while spending its waking hours in the crib.

Crib mobiles are suspended from a hanger that attaches to either the crib bars, railing, headboard, or wall and hangs over the mattress area of the crib. Crib mobiles display amusing, often colorful objects or characters that are suspended from its arms, or appendages, and are the visual focal point for the infant. Examples of these objects or characters are flowers, rainbows, stars, mirrors, animals and clowns. They range in complexity from a simple flat silhouette, to three dimensional shapes and stuffed, soft characters such as bunnies, bears or clowns.

The arms from which these objects or characters are suspended, can be either two independant arms crossing at their center points, or four arms radiating from a center hub. An example of another type of appendage would be a carrousel canopy. The arms or appendages with their objects or characters can remain stationary or revolve slowly when powered by a wind-up motor/music works or small electric D.C. motor.

The overall effect of the above is to pacify and entertain the infant while stimulating its newly developing visual and hearing senses.

The present generation of crib mobiles attain, to a point, the affore mentioned purposes; however, in a darkened nursery at nap or bedtime, the visual element of the mobile is somewhat diminished.

The mobile that addresses the lack of visibility of objects or characters in darkened conditions is the "Disney Starglow Musical Mobile" by Mattel Toy Company. This mobile utilizes a small light located at the crib rail attachment bracket that shines up to illuminate the bottom of the objects as they slowly revolve. While this is a step in the right direction, and illustrates the need to illuminate the objects or characters in the dark, the "Lighted Fiber Optics Mobile" takes the ultimate step by having it's objects or characters EMIT light individually.

SUMMARY OF INVENTION

The object of this invention is to cause the objects or characters, or any given point along the arms or appendages, of an infant crib mobile to emit active, variable light and thus become more attractive and stimulating to the infant, especially in subdued light at nap or bedtime.

The objects or characters are lighted by utilizing optic fibers to transmit light from a light source in the mobile's central housing, through the revolving arms or appendages, and to the objects or characters attached to the arms or appendages. Furthermore, the light can be colorful and/or active by the placement of a transparent light influence slide (L.I. slide) between the light source and the input end of the fibers revolving in the arm's or appendage's hub. This can result in light twinkling on and off, or colors changing or sequencing at the output end of the optic fibers at any point along the appendages, or in the objects or characters.

DESCRIPTION OF DRAWINGS

FIG. 2 is a bottom view of the mobile to illustrate the output ends of eleven optic fibers in each star.

FIG. 3 is an internal, partial cutaway side view of the mobile's central housing, one arm and one star.

FIG. 4a is a top view of the hub, optic fibers' input ends, and the on/off twinkle L.I. slide.

FIG. 4b is a top view of the hub, optic fibers' input ends, and multiple color twinkle L.I. slide.

DESCRIPTION OF THE PREFERRED EMBODIMENT

Figure 1:
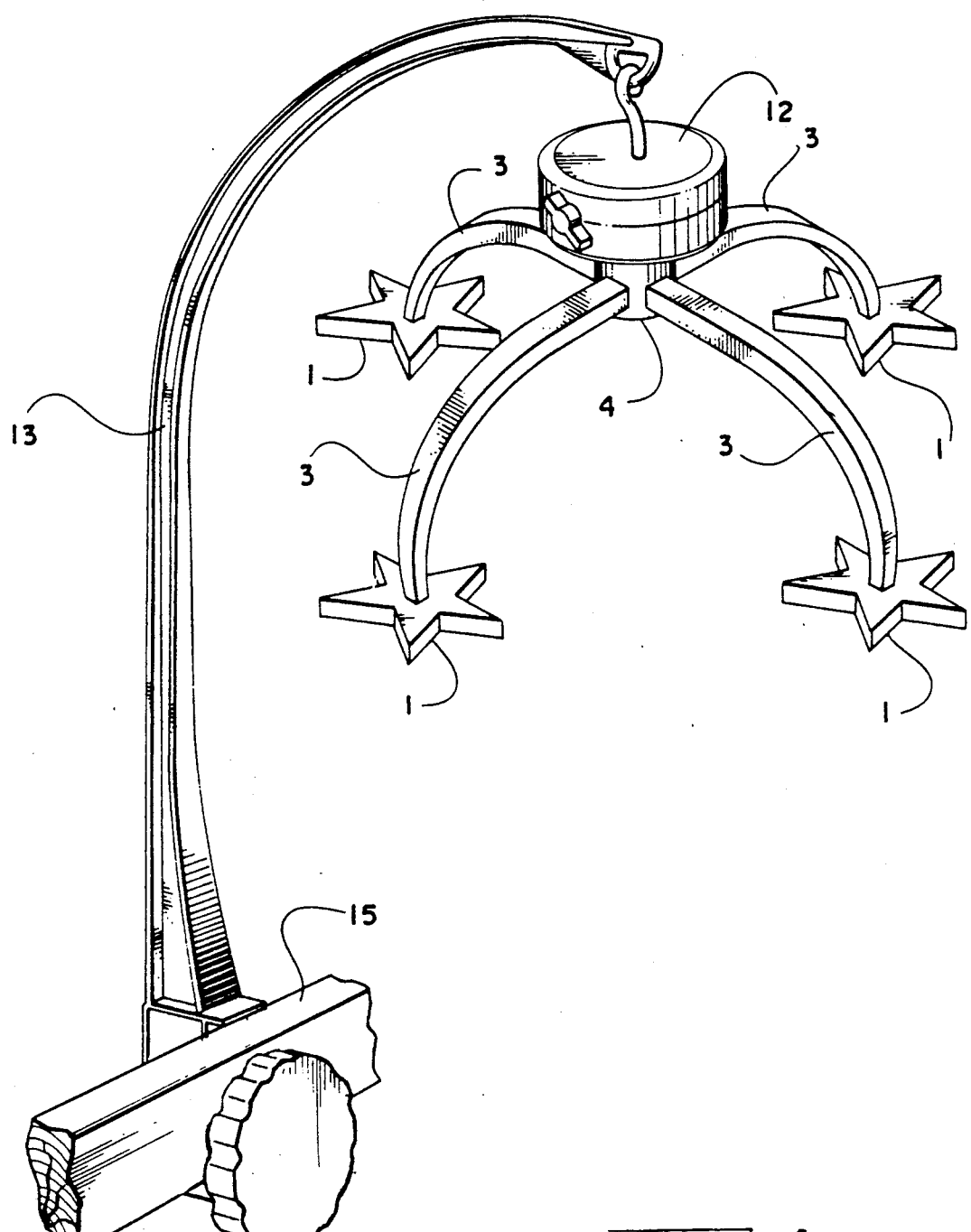
FIG. 1 is a perspective drawing of the Lighted Fiber Optic Mobile featuring twinkling stars, suspended from its hanger, attached to a crib railing.

As shown in FIGS. 1 & 2, the objects featured on the Lighted Fiber Optic Mobile are four stars 1. FIG. 2, a bottom view, shows the four stars' undersides as seen by the infant, and the output ends of the eleven optic fiber tips 2a that are allowed to protrude slightly from each star. It is from these fiber tips that light will be emitted after the mobile is wound and the stars 1, arms 3, and hub 4 begin to slowly revolve. The nature of the light, or the effect created by the light emitting from the output end of the fibers, can be either a random on/off twinkle of light, or a random color change twinkle. The method for creating both effects will be discussed a little later.

FIG. 3 is a side, internal view that should now be referenced to trace the route of the optic fibers in one star (typical of the other three) to the light source. The star 1 is shown in a cutaway view, consists of a hollow, two piece plastic body, star insert 5, and transparent plastic lens 6. The plastic star insert contains eleven holes through which the fibers pass and protrude approximately 1/32" from the bottom 2a. The fiber's output ends are flared by cutting with a hot wire to prevent the fibers from pulling up through the insert. Flaring also slightly increases the fiber tip diameter to produce a larger point of light. (Only six fibers are illustrated for clarity.) The star insert sets in the open face of the lower half of the star body behind the transparent plastic lens 6. The fibers are grouped together on top of the star insert inside the star body 2b. The fibers, illustrated by the dashed lines 2c, proceed up through the hollow plastic arm 3. The fibers from all four arms converge in the bottom of the hub 4 and proceed upward along the inside wall of the hub 2d. Also note 2e in the top view of the hub 4 in FIG. 4a. The fibers are held to the inside wall of the hub by a plastic center plug 7, FIGS. 4a & 4b, that press fits into the top of the hub. Referring back to FIG. 3, the fibers 2e are cut to length just above the hub and hub gear 8. It can be noted here that the hub gear is driven by the drive gear of the motor/music works 9, thus resulting in rotation of the hub, arms and stars.

Light is entered into the input end of the fibers 2e by the light source which is comprised of a RAYOVAC high intensity, two prong, mini flashlight; or the equivalent, bulb 10 and reflector 11. Power is supplied to the bulb by two AA batteries (not shown) located in the central housing 12, or in a battery compartment on the hanger 13, FIG. 1. A switch to turn the light source on upon winding the motor/music works 9, and off at completion of the tune is a planetary gear type that works off of the winding stem (not shown).

The nature of the light emitted from the output end of the fibers 2a on the bottom of the stars is determined by a light influencing device known as the light influence slide (L.I. slide) 14, FIGS. 3, 4a & 4b, fixed stationary between the light source 10, 11 and the revolving input ends of the fibers 2e, FIG. 3. The L.I. slide is a transparent piece of plastic with a screen Printed circle of either transparent and opaque segments, 16, 17, FIG. 4a, or various transparent color segments 18, FIG. 4b.

An on/off, black and white twinkle is created at the output ends of the fibers on the star bottoms by utilizing the L.I. slide 14, FIG. 4a with transparent and opaque segments. As light shines down through the transparent segments 16 into the input ends of the revolving fibers 2e, the opaque segments 17 simultaneously, momentarily block light from entering the fibers passing directly below each segment. The input ends of the fibers are arranged in the hub 4 in a random order to produce a random on/off twinkle at the output ends on each star bottom.

Similarly, to create a multiple color change twinkle on the star bottoms, and L.I. slide 14, FIG. 4b with various color segments 18 is utilized. As the input ends of the fibers pass beneath the various transparent color segments 18, the color of light emitting from the output ends of the fibers will correspond accordingly.

The end result of the above as viewed by the infant, are slowly revolving, twinkling stars, while the music works plays "Twinkle, Twinkle, Little Star".

The use of the light source, L.I. slide and optic fibers to deliver active, colorful light to the objects or characters, or any point along the appendages of an infant crib mobile can result in numerous applications and possibilities to entertain and stimulate the eyes of the newborn infant.

The foregoing description of the preferred embodiment of the invention/improvement has been presented for the purpose of illustration and description. It is not intended to be exhaustive or limit the invention/improvement to the precise form disclosed. Many modifications and variations are possible in light of the above teaching. It is intended that the scope of the invention/improvement be limited not by this detailed description, but rather by the claims appended hereto.

I claim:

1. A mobile comprising:
   a light source;
   a plurality of optic fibers having first ends adjacent said light source and also having second ends;
   at least one display object suspended in said mobile having said second ends of said plurality of optic fibers terminating in said at least one display object; and
   means for periodically altering transmission of light from said light source to said first ends of said plurality of optic fibers.

2. The invention of claim 1, wherein said first ends of said plurality of optic fibers form a circular curve, and wherein said means for periodically altering transmission of light from said light source comprises a stencil interposed between said light source and said first ends of said plurality of optic fibers, said stencil defining alternating areas of materials having differing light-transmission properties, said alternating areas juxtaposed over said circular curve of said first ends of said plurality of optic fibers.

3. The invention of claim 2, said alternating areas of materials having differing light-transmission properties comprising areas of materials which prohibit transmission of light and areas of material which allow transmission of light.

4. The invention of claim 2, said alternating areas of materials having differing light-transmission properties comprising areas of light diffusing materials of different colors.

5. A light display comprising:
   support means;
   a housing;
   means suspending said housing from said support means;
   a light source fixed within said housing;
   at least one display object;
   means suspending said at least one display object from said housing;
   a plurality of optic fibers having first ends forming a circular curve adjacent said light source and having second ends terminating in said at least one display object;
   a stencil interposed between said light source and said first ends of said plurality of optic fibers, said stencil defining alternating areas of materials having differing light-transmission properties, said alternating areas juxtaposed over said circular curve of said first ends of said plurality of optic fibers; and
   means for rotating said circular curve of said first ends of said plurality of optic fibers and said stencil with respect to one another.

6. The invention of claim 5, said alternating areas of materials having differing light-transmission properties comprising areas of materials which prohibit transmission of light and areas of material which allow transmission of light.

7. The invention of claim 5, said alternating areas of materials having differing light-transmission properties comprising areas of light diffusing materials of different colors.

8. The invention of claim 5, said second ends of said plurality of optic fibers terminating in a display surface of said at least one display object.

9. A mobile comprising:
   a light source;
   a plurality of optic fibers having first ends forming a circular curve adjacent said light source and having second ends;
   at least one display object suspended in said mobile, having said second ends of said plurality of optic fibers terminating in said at least one display object;
   a stencil interposed between said light source and said first ends of said plurality of optic fibers, said stencil defining alternating areas of materials having differing light-transmission properties, said alternating areas juxtaposed over said circular curve of said first ends of said plurality of optic fibers; and
   means for rotating said circular curve of said first ends of said plurality of optic fibers and said stencil with respect to one another.

10. The invention of claim 9, said alternating areas of materials having differing light-transmission properties comprising areas of materials which prohibit transmission of light and areas of material which allow transmission of light.

11. The invention of claim 9, said alternating areas of materials having differing light-transmission properties comprising areas of light diffusing materials of different colors.

12. The invention of claim 9, said second ends of said plurality of optic fibers terminating in a display surface of said at least one display object.

13. The invention of claim 9, wherein said display object has a planar surface containing said second ends of said plurality of optic fibers.

* * * * *